(12) United States Patent
Katayama et al.

(10) Patent No.: US 8,190,959 B2
(45) Date of Patent: May 29, 2012

(54) WIRELESS COMMUNICATION SYSTEM, TERMINAL AND BASE STATION

(75) Inventors: Rintaro Katayama, Kokubunji (JP); Toshiyuki Saito, Kyotanabe (JP); Mikio Kuwahara, Yokohama (JP); Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 702 days.

(21) Appl. No.: 12/388,051

(22) Filed: Feb. 18, 2009

(65) Prior Publication Data
US 2009/0210766 A1 Aug. 20, 2009

(30) Foreign Application Priority Data

Feb. 20, 2008 (JP) ................................ 2008-038165
Jan. 14, 2009 (JP) ................................ 2009-005300

(51) Int. Cl.
*H04L 1/18* (2006.01)
*G08C 25/02* (2006.01)
(52) U.S. Cl. ......... 714/748; 714/750; 714/751; 714/749
(58) Field of Classification Search ........... 714/748–751
See application file for complete search history.

(56) References Cited

U.S. PATENT DOCUMENTS

| | | | | |
|---|---|---|---|---|
| 6,948,108 B1* | 9/2005 | Ludwig et al. | ................. | 714/748 |
| 2002/0181440 A1* | 12/2002 | Norman et al. | ................ | 370/351 |
| 2003/0227909 A1* | 12/2003 | Mose et al. | .................... | 370/352 |
| 2005/0147042 A1* | 7/2005 | Purnadi et al. | ................ | 370/236 |
| 2007/0115823 A1* | 5/2007 | Shen | ............................. | 370/235 |
| 2007/0258384 A1* | 11/2007 | Sammour et al. | ............. | 370/252 |
| 2009/0097424 A1* | 4/2009 | Greiner et al. | ................ | 370/310 |

OTHER PUBLICATIONS

"Physical Layer for Ultra Mobile Broadband (UMB) Air Interface Specification", 3GPP2 C.S0084-001-0, Ver. 2, Aug. 2007, 2.8 MIMO Procedures, pp. 2-86 to 2-95.
"Physical Layer for Ultra Mobile Broadband (UMB) Air Interface Specification", 3GPP2 C.S0084-001-0, Ver. 2, Aug. 2007, 4.1.3.5.7 Forward Data Channel MINO Multi-Code Word Mode, pp. 4-53 to 4-54.
"Medium Access Control Layer for Ultra Mobile Broadband (UMB) Air Interface Specification", 3GPP2 C.S0084-002-0, Ver 2, Aug. 2007, 5.5.4.1.1.3.2 Forward Link Assignment Blocks, pp. 5-14 to 5-17.
"Medium Access Control Layer for Ultra Mobile Broadband (UMB) Air Interface Specification", 3GPP2 C.S0084-002-0, Ver 2, Aug. 2007, 6.5 Procedures for the in Use Instance, pp. 6-3 to 6-46.

* cited by examiner

*Primary Examiner* — Guy Lamarre
(74) *Attorney, Agent, or Firm* — Mattingly & Malur, PC

(57) ABSTRACT

A non-terminated packet is transmitted, by utilizing a spatial layer responded with an ACK, which is assumed as a released layer. Alternatively, a non-terminated packet is transmitted by using a released layer and an original spatial layer in combination. Alternatively, a new packet is transmitted in a released layer by utilizating time till termination of transmission of a non-terminated packet. A wireless communication system effectively utilizing a released layer, a terminal and a base station.

18 Claims, 18 Drawing Sheets

FIG.3

| FRAME NUMBER | LAYER 0 | LAYER 1 | LAYER 2 | LAYER 3 |
|---|---|---|---|---|
| 0 | ↓$SP_{0,0}$ | ↓$SP_{1,0}$ | ↓$SP_{2,0}$ | ↓$SP_{3,0}$ |
| ⋮ | | | | |
| 5 | ↑NAK | ↑NAK | ↑NAK | ↑NAK |
| ⋮ | | | | |
| 8 | ↓$SP_{0,1}$ | ↓$SP_{1,1}$ | ↓$SP_{2,1}$ | ↓$SP_{3,1}$ |
| ⋮ | | | | |
| 13 | ↑NAK | ↑ACK | ↑NAK | ↑NAK |
| ⋮ | | | | |
| 16 | ↓$SP_{0,2}$ | ///// | ↓$SP_{2,2}$ | ↓$SP_{3,2}$ |
| ⋮ | | | | |
| 21 | ↑ACK | | ↑NAK | ↑NAK |
| ⋮ | | | | |
| 24 | ///// | ///// | ↓$SP_{2,3}$ | ↓$SP_{3,3}$ |
| ⋮ | | | | |
| 21 | | | ↑NAK | ↑NAK |
| ⋮ | | | | |
| 32 | ///// | ///// | ↓$SP_{2,4}$ | ↓$SP_{3,4}$ |
| ⋮ | | | | |
| 21 | | | ↑ACK | ↑NAK |
| ⋮ | | | | |
| 40 | ///// | ///// | ///// | ↓$SP_{3,5}$ |
| ⋮ | | | | |
| 21 | | | | ↑ACK |
| ⋮ | | | | |
| 48 | | | | |
| ⋮ | | | | |

FIG.7

| 701 | 702 | 703 | 704 | 705 | 706 | 707 | 708 | 709 |
|---|---|---|---|---|---|---|---|---|
| Block Type 3 bit | Sticky 1 bit | Channel ID 6-8 bit | Subtree ID 1-2 bit | PF 4 bit | Pilot/MIMO 5 bit | HARQ 1 bit | Extended Tx 1 bit | Supple-mental 1 bit |

FIG.8

| FRAME NUMBER | LAYER 0 | LAYER 1 | LAYER 2 | LAYER 3 |
|---|---|---|---|---|
| 0 | ↓$SP_{0,0}$ | ↓$SP_{1,0}$ | ↓$SP_{2,0}$ | ↓$SP_{3,0}$ |
| ⋮ | | | | |
| 5 | ↑NAK | ↑NAK | ↑NAK | ↑NAK |
| ⋮ | | | | |
| 8 | ↓$SP_{0,1}$ | ↓$SP_{1,1}$ | ↓$SP_{2,1}$ | ↓$SP_{3,1}$ |
| ⋮ | | | | |
| 13 | ↑NAK | ↑ACK | ↑NAK | ↑NAK |
| ⋮ | | | | |
| 16 | ↓$SP_{0,2}$ | ↓$SP_{3,3}$ | ↓$SP_{2,2}$ | ↓$SP_{3,2}$ |
| ⋮ | | | | |
| 21 | ↑ACK | | ↑NAK | ↑NAK |
| ⋮ | | | | |
| 24 | ↓$SP_{2,4}$ | ↓$SP_{3,5}$ | ↓$SP_{2,3}$ | ↓$SP_{3,3}$ |
| ⋮ | | | | |
| 21 | | | ↑ACK | ↑ACK |
| ⋮ | | | | |
| 32 | | | | |
| ⋮ | | | | |
| 21 | | | | |
| ⋮ | | | | |
| 40 | | | | |
| ⋮ | | | | |
| 21 | | | | |
| ⋮ | | | | |
| 48 | | | | |

FIG.9

| FRAME NUMBER | LAYER 0 | LAYER 1 | LAYER 2 | LAYER 3 |
|---|---|---|---|---|
| 0 | ↓$SP_{0,0}$ | ↓$SP_{1,0}$ | ↓$SP_{2,0}$ | ↓$SP_{3,0}$ |
| ⋮ | | | | |
| 5 | ↑NAK | ↑NAK | ↑NAK | ↑NAK |
| ⋮ | | | | |
| 8 | ↓$SP_{0,1}$ | ↓$SP_{1,1}$ | ↓$SP_{2,1}$ | ↓$SP_{3,1}$ |
| ⋮ | | | | |
| 13 | ↑NAK | ↑ACK | ↑NAK | ↑NAK |
| ⋮ | | | | |
| 16 | ↓$SP_{0,2}$ | ↓$SP_{3,2}$ | ↓$SP_{2,2}$ | ↓$SP_{3,2}$ |
| ⋮ | | | | |
| 21 | ↑ACK | | ↑NAK | ↑NAK |
| ⋮ | | | | |
| 24 | ↓$SP_{2,3}$ | ↓$SP_{3,3}$ | ↓$SP_{2,3}$ | ↓$SP_{3,3}$ |
| ⋮ | | | | |
| 21 | | | ↑ACK | ↑ACK |
| ⋮ | | | | |
| 32 | | | | |
| ⋮ | | | | |
| 21 | | | | |
| ⋮ | | | | |
| 40 | | | | |
| ⋮ | | | | |
| 21 | | | | |
| ⋮ | | | | |
| 48 | | | | |

FIG.10

| FRAME NUMBER | LAYER 0 | LAYER 1 | LAYER 2 | LAYER 3 |
|---|---|---|---|---|
| 0 | ↓$SP_{0,0}$ | ↓$SP_{1,0}$ | ↓$SP_{2,0}$ | ↓$SP_{3,0}$ |
| ⋮ | | | | |
| 5 | ↑NAK | ↑NAK | ↑NAK | ↑NAK |
| ⋮ | | | | |
| 8 | ↓$SP_{0,1}$ | ↓$SP_{1,1}$ | ↓$SP_{2,1}$ | ↓$SP_{3,1}$ |
| ⋮ | | | | |
| 13 | ↑NAK | ↑ACK | ↑NAK | ↑NAK |
| ⋮ | | | | |
| 16 | ↓$SP_{0,2}$ | ↓$SP_{3,0}$ | ↓$SP_{2,2}$ | ↓$SP_{3,2}$ |
| ⋮ | | | | |
| 21 | ↑ACK | | ↑NAK | ↑NAK |
| ⋮ | | | | |
| 24 | ↓$SP_{2,0}$ | ↓$SP_{3,1}$ | ↓$SP_{2,3}$ | ↓$SP_{3,3}$ |
| ⋮ | | | | |
| 21 | | | ↑ACK | ↑ACK |
| ⋮ | | | | |
| 32 | | | | |
| ⋮ | | | | |
| 21 | | | | |
| ⋮ | | | | |
| 40 | | | | |
| ⋮ | | | | |
| 21 | | | | |
| ⋮ | | | | |
| 48 | | | | |

FIG.11

| FRAME NUMBER | LAYER 0 | LAYER 1 | LAYER 2 | LAYER 3 |
|---|---|---|---|---|
| 0 | ↓SP$_{0,0}$ | ↓SP$_{1,0}$ | ↓SP$_{2,0}$ | ↓SP$_{3,0}$ |
| ⋮ | | | | |
| 5 | ↑NAK | ↑NAK | ↑NAK | ↑NAK |
| ⋮ | | | | |
| 8 | ↓SP$_{0,1}$ | ↓SP$_{1,1}$ | ↓SP$_{2,1}$ | ↓SP$_{3,1}$ |
| ⋮ | | | | |
| 13 | ↑NAK | ↑ACK | ↑NAK | ↑NAK |
| ⋮ | | | | |
| 16 | ↓SP$_{0,2}$ | ↓PB$_3$ | ↓SP$_{2,2}$ | ↓SP$_{3,2}$ |
| ⋮ | | | | |
| 21 | ↑ACK | | ↑NAK | ↑NAK |
| ⋮ | | | | |
| 24 | ↓PB$_2$ | ↓PB$_3$ | ↓SP$_{2,3}$ | ↓SP$_{3,3}$ |
| ⋮ | | | | |
| 21 | | | ↑ACK | ↑ACK |
| ⋮ | | | | |
| 32 | | | | |
| ⋮ | | | | |
| 21 | | | | |
| ⋮ | | | | |
| 40 | | | | |
| ⋮ | | | | |
| 21 | | | | |
| ⋮ | | | | |
| 48 | | | | |

FIG.12

| FRAME NUMBER | LAYER 0 | LAYER 1 | LAYER 2 | LAYER 3 |
|---|---|---|---|---|
| 0 | ↓$SP_{0,0}$ | ↓$SP_{1,0}$ | ↓$SP_{2,0}$ | ↓$SP_{3,0}$ |
| ⋮ | | | | |
| 5 | ↑NAK | ↑NAK | ↑NAK | ↑NAK |
| ⋮ | | | | |
| 8 | ↓$SP_{0,1}$ | ↓$SP_{1,1}$ | ↓$SP_{2,1}$ | ↓$SP_{3,1}$ |
| ⋮ | | | | |
| 13 | ↑NAK | ↑ACK | ↑NAK | ↑NAK |
| ⋮ | | | | |
| 16 | ↓$SP_{0,2}$ | ↓$SP_{3,2}$ | ↓$SP_{2,2}$ | |
| ⋮ | | | | |
| 21 | ↑ACK | ↑NAK | ↑NAK | |
| ⋮ | | | | |
| 24 | | ↓$SP_{3,3}$ | ↓$SP_{2,3}$ | |
| ⋮ | | | | |
| 21 | | ↑NAK | ↑NAK | |
| ⋮ | | | | |
| 32 | | ↓$SP_{3,4}$ | ↓$SP_{2,4}$ | |
| ⋮ | | | | |
| 21 | | ↑ACK | ↑ACK | |
| ⋮ | | | | |
| 40 | | | | |
| ⋮ | | | | |
| 21 | | | | |
| ⋮ | | | | |
| 48 | | | | |

FIG.13

| FRAME NUMBER | LAYER 0 | LAYER 1 | LAYER 2 | LAYER 3 |
|---|---|---|---|---|
| 0 | ↓$SP_{0,0}$ | ↓$SP_{1,0}$ | ↓$SP_{2,0}$ | ↓$SP_{3,0}$ |
| ⋮ | | | | |
| 5 | ↑NAK | ↑NAK | ↑NAK | ↑NAK |
| ⋮ | | | | |
| 8 | ↓$SP_{0,1}$ | ↓$SP_{1,1}$ | ↓$SP_{2,1}$ | ↓$SP_{3,1}$ |
| ⋮ | | | | |
| 13 | ↑NAK | ↑ACK | ↑NAK | ↑NAK |
| ⋮ | | | | |
| 16 | ↓$SP_{0,2}$ | ↓$SP_{1,0}$ | ↓$SP_{2,2}$ | ↓$SP_{3,2}$ |
| ⋮ | | | | |
| 21 | ↑ACK | ↑NAK | ↑NAK | ↑NAK |
| ⋮ | | | | |
| 24 | ///// | ↓$SP_{1,1}$ | ↓$SP_{2,3}$ | ↓$SP_{3,3}$ |
| ⋮ | | | | |
| 21 | | ↑NAK | ↑NAK | ↑NAK |
| ⋮ | | | | |
| 32 | ///// | ↓$SP_{1,2}$ | ↓$SP_{2,4}$ | ↓$SP_{3,4}$ |
| ⋮ | | | | |
| 21 | | ↑ACK | ↑ACK | ↑NAK |
| ⋮ | | | | |
| 40 | ///// | ///// | ///// | ↓$SP_{3,5}$ |
| ⋮ | | | | |
| 21 | | | | ↑ACK |
| ⋮ | | | | |
| 48 | | | | |

WIRELESS COMMUNICATION SYSTEM, TERMINAL AND BASE STATION

INCORPORATION BY REFERENCE

The present application claims priority from Japanese patent application JP 2008-038165 filed on Feb. 20, 2008 and JP 2009-005300 filed on Jan. 14, 2009, the contents of which is hereby incorporated by reference into this application.

BACKGROUND OF THE INVENTION

The present invention relates to a wireless communication system, which is a communication system employing an MCW-MIMO (Multi Code Word-Multiple Input Multiple Output) in wireless communication and relating to a system attaining cellular communication, a terminal and a base station.

As technology to enhance frequency utilization efficiency in wireless communication, the MIMO (Multiple Input Multiple Output) has been widely employed. In the MIMO, a transmitter and a receiver has a plurality of antenna elements, respectively, and by carrying out the suitable signal processing at the receiver side, a plurality of independent space channels is generated, and different data streams can be simultaneously transmitted by each of the space channels, even in the same frequency channel. Here, "data stream" means a wireless signal transmitted from each of the transmission antenna elements of the transmitter.

FIG. 1 shows an example for explaining the concept of MIMO transmission. A wireless signal transmitted from some of the antenna elements 101 of the transmitter is received by a plurality of antenna elements 102 of the receiver through different radio channels. In this case, as shown in FIG. 1, each of the antenna elements 102 of the receiver receives a plurality of wireless signals added, which signals are simultaneously transmitted from a plurality of the transmission antenna elements 101.

The receiver separates a wireless signal transmitted from each of the transmission antenna elements from the received signal, by carrying out the multi-antenna signal processing. As the multi-antenna signal processing, a weighting processing (MMSE filter) by an MMSE (Minimum Mean Square Error) algorithm has been most generally known.

The MMSE means to make the mean square error of a transmitted signal and MMSE filter output minimum, and it is known that it decreases signal power of the data streams other than a desired data stream, to almost a degree of noise power. The MMSE filter can separate the desired data stream, by carrying out the linear processing where the weighing is carried out based on MMSE criterion for the signals received by each of the receiving antenna elements, and then combining them.

As the signal processing for separating the desired data stream, SIC (Successive Interference Canceller) has also been widely known. The SIC is non-linear signal processing to enhance signal gain of the desired data stream, by canceling interference from the data streams other than the desired data stream in the received signals.

The SIC is used in combination with linear processing such as the MMSE filter. First, the received signals are passed through the MMSE filter to separate the data stream for demodulation and decoding, and then the separated data sequence is re-modulated to generate received signal components of a specific data stream contained in the received signals, by using radio channel information estimated from the received signals. The received signals after subtraction this received signal components are input again to the MMSE filter. In this way, the SINR (Signal-to-Interference and Noise Power Ratio) for the second round of output of the MMSE filter, as compared with the first round of output of the MMSE filter, because some data stream is cancelled in advance. The SINR can be enhanced by repeating this series of operations to cancel sequentially the data streams.

Contrary to the MIMO, a system equipped with a single antenna element for both the transmitter and the receiver is called SISO (Single Input Single Output). In the SISO, it is only possible to simultaneously transmit a single data stream in the same frequency channel. However, the MIMO achieves significant enhancement of wireless transmission capacity, because it is possible to transmit simultaneously a plurality of different data streams using the same frequency channel.

This technique is to be interpreted as generation of a plurality of independent space channels by carrying out the signal processing such as the MMSE and the SIC, therefore called SM (Spatial Multiplexing). This space channel is also called a spatial layer, from an image of transmission of wireless signals in parallel, in each of the layers, by dividing a radio channel to several layers.

It should be noted that it is necessary for the number of the receiving antenna elements to be equal to or more than the number of transmission data streams, in order to separate each of the transmission data streams in the MIMO. In addition, the number of data streams, which can be transmitted simultaneously, is equal to or less than the number of the transmission antenna elements. That is, the maximum number of the spatial layers, which are possible to be generated in view of the structure of the transmitter and the receiver, coincides with a smaller value between the number of the transmission antenna elements, and the number of the receiving antenna elements. However, from restriction by quality of the radio channel or the like, there may be the case where the number of spatial layer, which can be generated, becomes less than the maximum number of the spatial layers, which can be generated in view of the structure. The number of the spatial layers, which are possible to be generated practically and determined depending on radio channel states, is called Rank.

As one embodiment of the MIMO for carrying out the spatial multiplexing, the MCW-MIMO has been studied. The MCW-MIMO is a system for transmitting each of the data packets generated independently, in each of the spatial layers. On the other hand, a system for transmitting a single packet using a plurality of spatial layers is called SCW-MIMO (Single Code Word-Multiple Input Multiple Output).

FIG. 2 shows a concept of a MCW-MIMO system. In the MCW-MIMO system, transmitted data is divided first to a plurality of subpackets by a demultiplexer 201 in response to the number of the spatial layers (Rank number). The transmitted data divided to a plurality of subpackets is each subjected to coding by turbo coding or the like, or modulation processing by a coding and modulation unit 202, and then transmitted as wireless signals from separate transmission antenna elements. These wireless signals are received through independent spatial layers 203 generated by multi-antenna signal processing such as the MMSE or SIC, and are separately subjected to decoding and demodulation processing at a demodulation and decoding unit 204. Finally, a plurality of transmitted data received is put together in a multiplexer 205 to obtain the received data.

In order to explain on the MCW-MIMO still more specifically, explanation will be given here on HARQ (Hybrid Automatic Repeat Request), which is a re-transmission control system frequently to be used in the wireless communication system. It is because the MCW-MIMO is characterized in that not only coding & decoding and modulation & demodulation but also re-transmission control by the HARQ are carried out separately for a packet corresponding to each of the spatial layers.

The HARQ is a high speed re-transmission control system closed in a physical layer, and it is employed in the wireless communication system such as, for example, cdma 2000 1xEV-DO. In the HARQ, in order to increase robustness in the radio channel, a packet composed of transmitted data and, for example, error detecting code (redundancy bits) generated by turbo coding, is divided to a plurality of subpackets for wireless transmission, and is transmitted and received by a subpacket unit. Usually, transmission is carried out in the order of a transmitted data bit series and a redundancy bits sequence. For example, data is transmitted by the first subpacket, and the redundancy bits are transmitted by the subsequent subpacket.

A data transmit node waits the response from a data receive node when a subpacket is transmitted, and decides a subpacket to be transmitted next. The data receive node, in the case of success in decoding the subpacket received, responds with an ACK (Acknowledgement), and in the case of failure in the coding, responds with a NAK (Negative Acknowledgement) to the data transmit node. In this case, the data receive node waits to receive the next subpacket, storing the received subpacket for which decoding was failed.

The data transmit node transmits the second subpacket, when the NAK is received for the first subpacket from the data receive node. The data receive node combines the first and the second subpackets when the second subpacket is received, to try decoding of the received data. That is, by utilizing the error detecting code (redundancy bits) received by the second subpacket, decoding of a data part of the first subpacket already received is tried. The data transmit node returns an ACK or a NAK to the data transmit node according to the result of decoding.

The data transmit node transmits the third subpacket, in the case of receiving the NAK as the response to the second subpacket from the data receive node. In the case where the error detecting code (redundancy bits) has been divided to a plurality of subpackets, the third subpacket transmits the residual part of the error detecting code. In this case, the data receive node, which received the third subpacket, combines the first, the second and the third subpackets to try decoding of the received data.

In this way, at every subpacket receiving in the data receive node, effective coding rate becomes smaller, and possibility of decoding successfully becomes higher. This feature is called IR (Incremental Redundancy).

The data transmit node of the HARQ system is equipped with repetition function for re-transmitting a packet transmitted already, when the NAK is received for the last subpacket. Therefore, when the NAK is received for the last subpacket, the data transmit node re-transmits the subpacket groups transmitted already in the order from the first subpacket, and waits to receive the ACK from the data receive node. In the data receive node, decoding is tried after increasing signal power by combining the newly received subpacket and the subpacket group transmitted already in advance. This function is called CC (Chase Combining).

In the present description, transmission of a subpacket to be carried out by the data transmit node in receiving the NAK, is called re-transmission, irrespective of whether the subpacket is a new one, or already transmitted one.

When the ACK is received from the data receive node, the data transmit node decides successful packet transmission and transmits a new data packet to be transmitted next to the data receive node in the above subpacket form. In the case where response of the NAK from the data receive node is repeated, and the number of the subpacket re-transmissions reached the number of limit determined in advance, the data transmit node stops the re-transmission of the subpacket. In this case, it means failure of packet transmission, and decision such as packet re-transmission request or received packet discarding is carried out by an upper layer of the data receive node.

In this way, in the HARQ system, where a transmitted packet including redundancy bits is divided to several subpackets before transmission, decoding of received data at the data receive node succeeds before receiving all of the redundancy bits when a radio channel state is good, and as a result, data communication utilizing effectively a wireless resource becomes possible. In the HARQ, by arranging a dedicated channel for transmitting the ACK/NAK information in the channel group of the physical layer, control closed in the physical layer becomes possible, and this speeds up the above re-transmission control.

In the MCW-MIMO, the above HARQ re-transmission control is carried out separately in each of the spatial layers. However, the number of re-transmissions till successful packet transmission depends on a radio channel state in each of the spatial layers, therefore it is different among the spatial layers. In the case where there is still a spatial layer for which packet transmission has not succeeded yet, while packet transmission has succeeded in some of the spatial layers and the data receive node carries out the ACK response for these spatial layers, a wireless signal is not transmitted hereafter in a layer for which packet transmission has succeeded.

By 3GPP2, which is a standardization group, a wireless system using the MCW-MIMO has been proposed, as UMB (Ultra Mobile Broadband). The above re-transmission control method is defined in 2.8 MIMO Procedures of 3GPP2 C.S0084-001-0 v2.0, 4.1.3.5.7 Forward Data Channel MIMO Multi-Code Word Mode of 3GPP2 C.S0084-001-0 v2.0, 5.5.4.1.1.3.2 Forward Link Assignment Blocks of 3GPP2 C.S0084-002-0 v2.0, and 6.5 Procedures for the InUse Instance C.S0084-002-0 v2.0.

In the MCW-MIMO system as explained in the above BACKGROUND OF THE INVENTION, the HARQ re-transmission is controlled independently in each of the spatial layers. FIG. 3 shows an example of a time sequence of HARQ re-transmission control in the MCW-MIMO. In FIG. 3, time is partitioned into time frame units with a fixed duration, and after 5 frames of transmission of certain subpackets by the transmit node, the receive node carries out the ACK or NAK response for those subpackets.

In the case of NAK response, the transmit node transmits the subsequent subpackets after 3 frames of the NAK response. Therefore, the transmit node carries out transmission of the subpackets in an 8-frame cycle. In addition, in an example of FIG. 3, 4 spatial layers are present (the number of Rank is 4), and packet transmission is carried out in each of the spatial layers. In FIG. 3, SPm,n represents the n-th subpacket transmitted in the m-th spatial layer.

Explanation will be given below on procedures of packet transmission, with reference to an example of the spatial layer 0 of FIG. 3. First, in the spatial layer 0, transmission of the first subpacket 0 is carried out in the frame 0. For this subpacket 0, the receive node carries out the ACK or NAK response in a frame 5. Here, the receive node fails the decoding of the subpacket 0, and responds with the NAK. Because the transmit node receives the NAK response, it transmits the subsequent subpacket 1 in a frame 8. After that, the receive node responds with the NAK in a frame 13, and the transmit node transmits the subpacket 2 in a frame 16. When the receive node responds with the ACK in a frame 21, the transmit node recognizes successful packet transmission, and the packet transmission in the spatial layer 0 is terminated.

Because in the spatial layer 0 of FIG. 3, the ACK response is sent back from the receive node after the third subpacket transmitted by the transmit node, this is referred to that the number of re-transmissions is 3, in the present description. In an example of FIG. 3, the numbers of re-transmissions in other spatial layers are 2 for the layer 1, 5 for the layer 2, and 6 for the layer 3, respectively.

Such variation of the numbers of re-transmissions among the spatial layers is caused by difference of radio channels among the spatial layers. That is, even when packets are transmitted by using the same wireless modulation scheme, coding scheme and coding rate, and with the same transmission power between the spatial layers, the number of re-transmissions differs due to difference of radio channel quality among the spatial layers, and the number of re-transmissions for a packet transmitted in a good quality spatial layer becomes less, and on the contrary, the number of re-transmissions for a packet transmitted in a poor quality spatial layer becomes more.

SUMMARY OF THE INVENTION

However, there has been no investigation on transmission and receiving of a signal in consideration of a point that radio channels are different among the spatial layers.

The present inventors have noticed on the point that radio channels are different among the spatial layers in such a communication system, and have studied on effective utilization of a released spatial layer, and communication in consideration of radio channel characteristics of each of the layers.

(1) Effective Utilization of a Spatial Layer

In the case where packet transmission is terminated earlier than other spatial layers, that is, in an example of FIG. 2, after termination of packet transmission in the spatial layer 1, the data transmission is not carried out at all in the spatial layer 1, till termination of packet transmission in all of other spatial layers. That is, in the spatial layer 1, frames 16, 24, and 32 are not utilized for data transmission, although wireless resources thereof are released. Such a spatial layer not used for the data transmission in certain period of time is called a released layer in the present description. In FIG. 3, the released layer is shown as an oblique-lined part of a frame. Presence of such a released layer incurs decrease in utilization efficiency of a wireless resource.

(2) Judgment of Good Layer

In addition, a good quality spatial layer has less number of re-transmissions of a packet, therefore has high possibility of earlier termination of packet transmission than other spatial layers. That is, it is considered that radio channel quality of a released layer is good. In this case, a non-terminated packet can be said to carry out transmission not using a good quality released layer but using a spatial layer having inferior radio channel quality as compared with the released layer. This incurs decrease in utilization efficiency of a wireless resource.

Accordingly, in order to attain the above (1) and (2), the present invention to a wireless communication system for transmitting and receiving a packet between a transmitter and a receiver by an MCW-MIMO system, where multiple spatial layers are independently controlled for hybrid automatic re-transmission request (HARQ re-transmission) and is characterized mainly by generating an ACK response for some of the spatial layers, in the case of success in receiving the subpacket transmitted in some of the spatial layers among the packet transmitted in a plurality of spatial layers from the transmitter by the ACK generation unit of the receiver; deciding whether the spatial layer corresponding to the ACK response transmitted from the receiver by the spatial layer control unit of the transmitter is used or not for transmission of other subpackets: and assuming a spatial layer, which was decided to use, as a released layer and assigning for transmission and receiving of other subpackets;

That is, transmission of a non-terminated packet is carried out by using a released layer. That is, in transmitting a subpacket of the non-terminated packet in the case where the released layer is present, transmission is carried out by using both of an original spatial layer assigned first to the non-terminated packet and a released layer, or only the released layer.

In this way, by utilizing both of the original spatial layer and the released layer as well as avoiding to leave the released layer unused for data transmission at all, possibility of successful decoding is increased within less number of re-transmissions in carrying out the transmission of the non-terminated packet, therefore termination timing becomes earlier, and utilization efficiency of a wireless resource is enhanced.

In addition, also in the case where transmission of the non-terminated packet is carried out by utilization of only the released layer without utilization of the original spatial layer, by selecting the released layer having good channel quality, termination timing of the non-terminated packet is made earlier and utilization efficiency of a wireless resource is enhanced. Therefore, the problem is solved.

Alternatively, in order to solve the above problem, new packet transmission is carried out by using a released layer. In this way, the released layer, in which data transmission is originally never carried out, can be utilized, and thus utilization efficiency of a wireless resource is enhanced. Therefore, the problem is solved.

According to the present invention, by transmitting the non-terminated packet using the released layer, where packet transmission has been terminated, the number of re-transmissions till termination becomes less, as compared with the case of not using the released layer. Therefore, because the number of packets transmitted successfully within a unit time can be increased, by which throughput of a system can be enhanced.

In addition, by carrying out the new packet transmission by using the released layer, data quantity that can be transmitted till termination of packet transmission in all of the spatial layers can be increased as compared with the case of not using the released layer, therefore, it is possible to enhance throughput of a system.

Therefore, according to the present invention, utilization efficiency of a wireless resource can be enhanced.

Other objects, features and advantages of the invention will become apparent from the following description of the embodiments of the invention taken in conjunction with the accompanying drawings.

BRIEF DESCRIPTION OF THE DRAWINGS

FIG. 3 is a drawing showing a time sequence of HARQ re-transmission timing in a MCW-MIMO system.

FIG. 7 is a drawing showing fields of an assignment block for notifying of control information on data transmission.

FIG. 8 is a drawing showing a time sequence of re-transmission timing in the first embodiment of the present invention.

FIG. 9 is a drawing showing a time sequence of re-transmission timing in the second embodiment of the present invention.

FIG. 10 is a drawing showing a time sequence of re-transmission timing in the second embodiment of the present invention.

FIG. 11 is a drawing showing a time sequence of re-transmission timing in the third embodiment of the present invention.

FIG. 12 is a drawing showing a time sequence of re-transmission timing in the fourth embodiment of the present invention.

FIG. 13 is a drawing showing a time sequence of re-transmission timing in the fifth embodiment of the present invention.

DESCRIPTION OF THE EMBODIMENTS

Explanation will be given below in detail on a wireless communication system applied the present invention, with reference to drawings.

Figure 1:
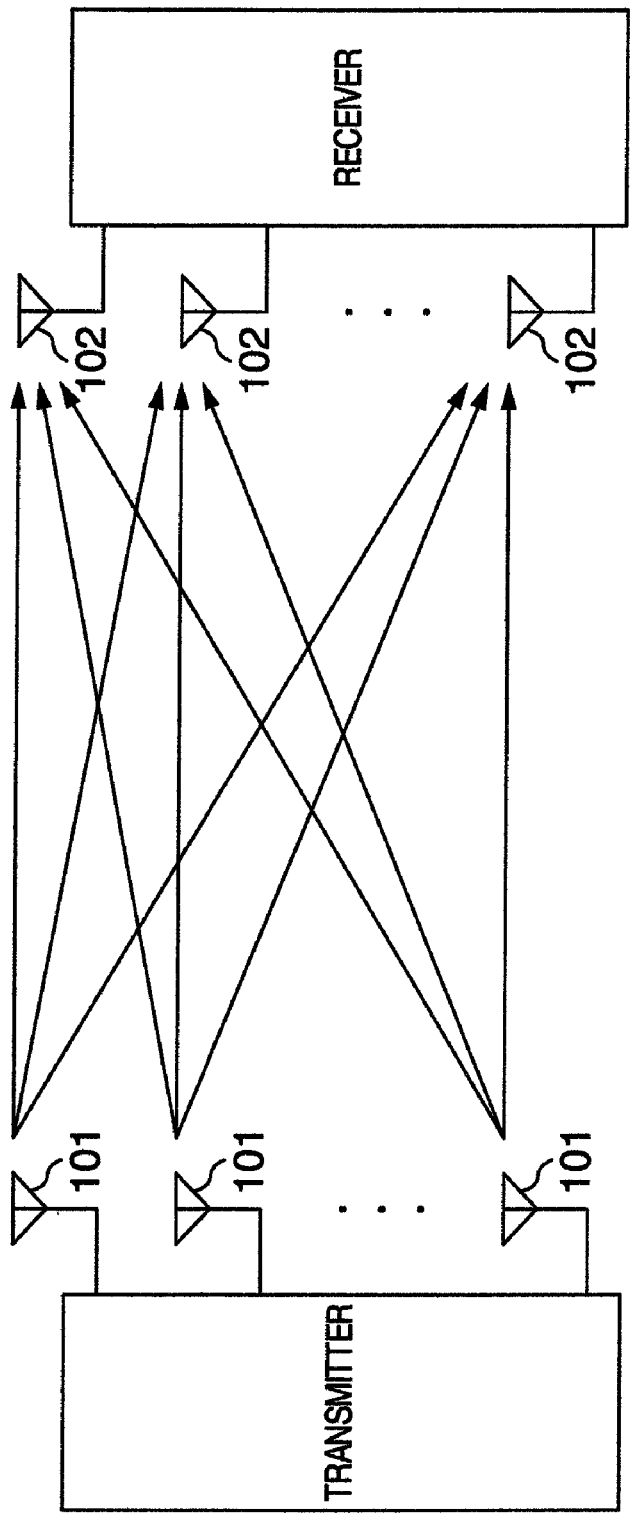
FIG. 1 is a schematic drawing of a MIMO system.
Figure 2:
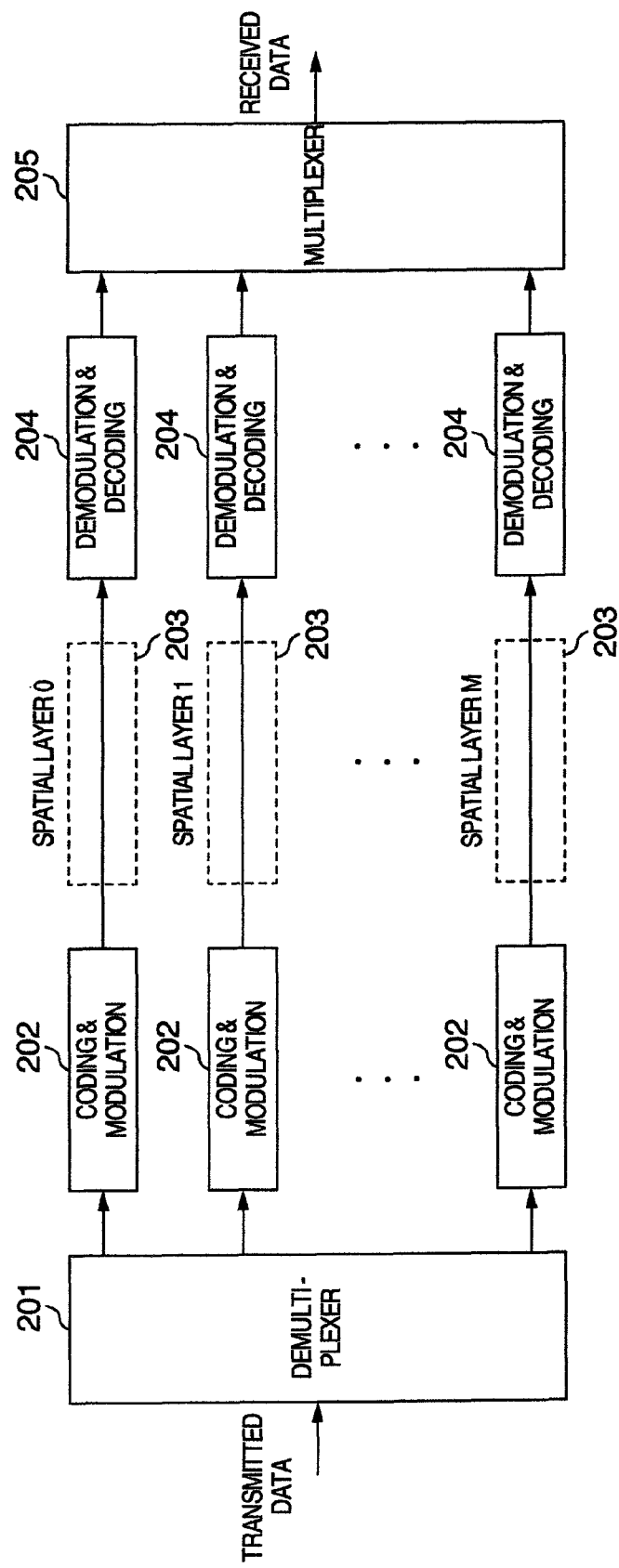
FIG. 2 is a schematic drawing showing concept of a MCW-MIMO.
Figure 4:
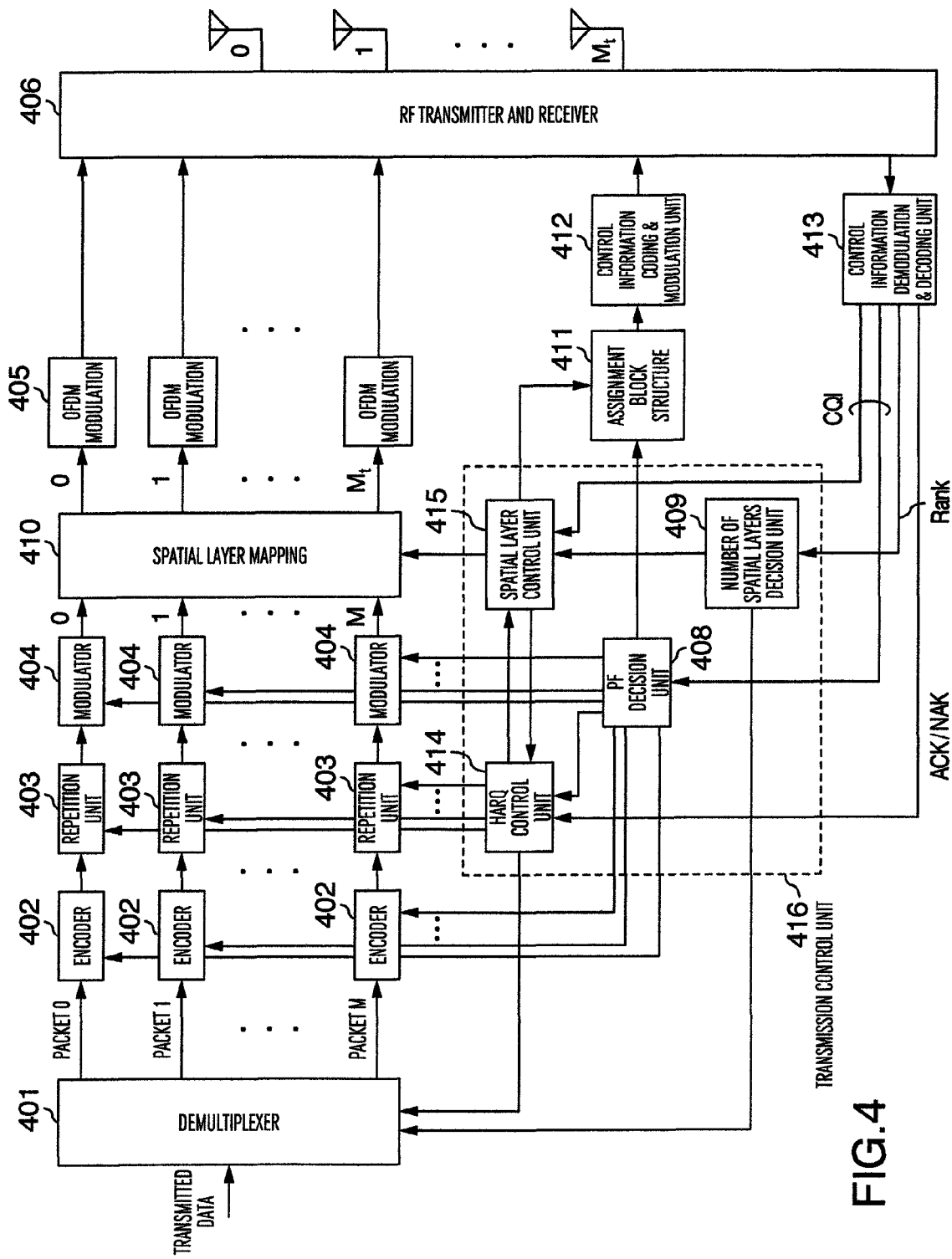
FIG. 4 is a schematic drawing showing a transmitter configuration in a MCW-MIMO system.
Figure 5:
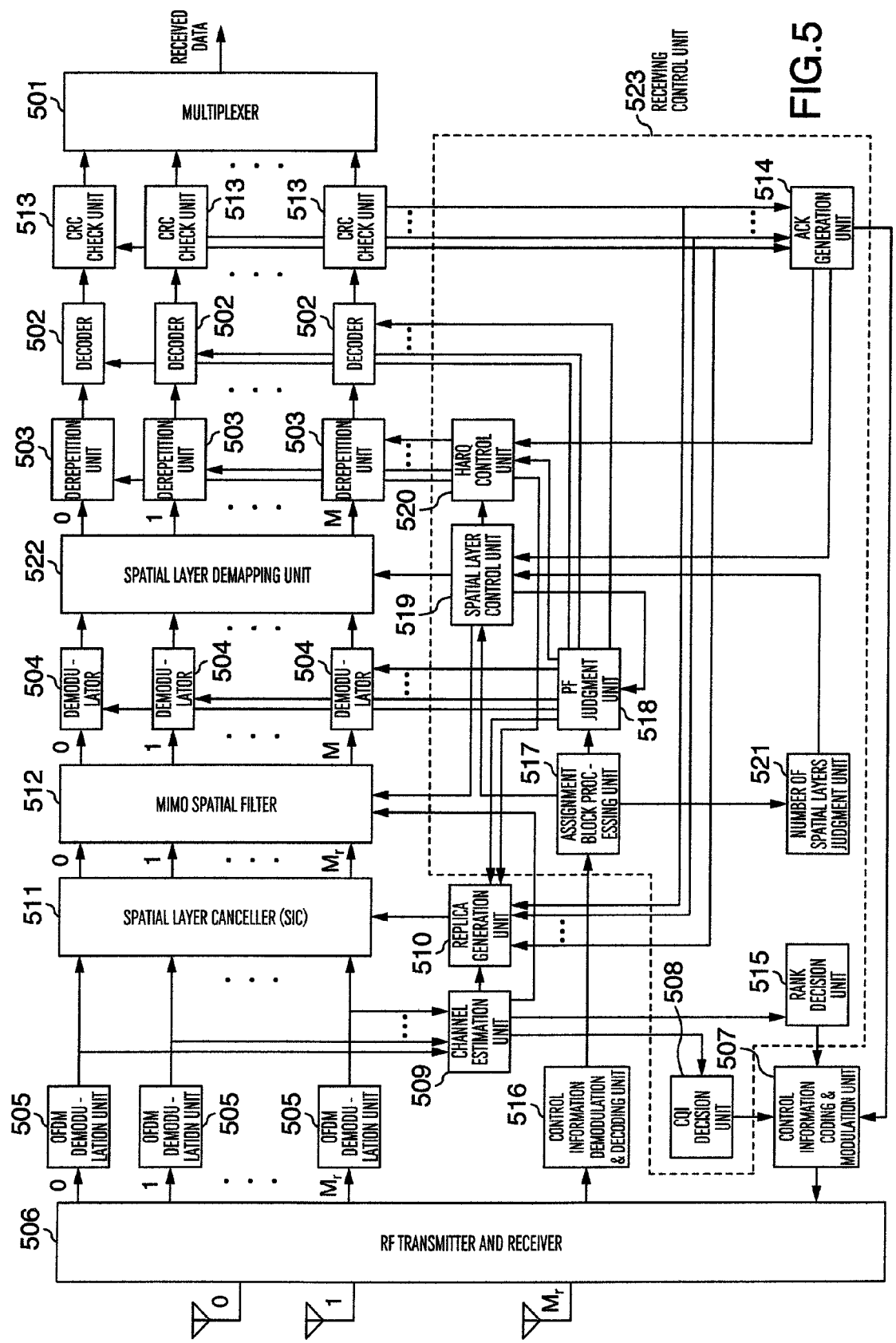
FIG. 5 is a schematic drawing showing a receiver configuration in a MCW-MIMO system.

A transmitter and a receiver for attaining the MCW-MIMO system are configured as shown in FIG. 4 and FIG. 5, respectively. The transmitter and the receiver of FIG. 4 and FIG. 5 use OFDM (Orthogonal Frequency Division Multiplexing), as a wireless signal, and assume the MCW-MIMO system using linear processing by a MMSE filter and non-linear processing by the SIC in combination, as signal processing for spatial multiplexing.

The transmitter of FIG. 4 has a RF transmitter and receiver 406, a control unit 416, a transmission circuit (a demultiplexer 401, an encoder 402, a repetition unit 403, a modulator 404, a spatial layer mapping unit 410, an OFDM modulation unit 405) and a receiving circuit not shown. The control unit 416 has a PF (packet format) decision unit 408, a number of spatial layers decision unit 409, an HARQ control unit 414 and a spatial layer control unit 415 in order to attain scheduling required in carrying out the data communication, or HARQ control function.

In the transmitter of FIG. 4, the transmission data is firstly divided into M pieces of packets to be transmitted in each of the spatial layers, in the demultiplexer 401. Here, the number of the spatial layers, M, is necessary to be equal to or smaller than the Rank number. The Rank is the number of the spatial layers, which can be generated, and is determined by a receiver according to a radio channel state. The transmitter has acquired the Rank number from the receiver through a control channel, and the Rank number can be acquired from control information communicated from the receiver, through a control information demodulation & decoding unit 413. The number of the spatial layers, M, is determined by the number of spatial layers decision unit 409 of the transmitter according to the Rank.

For the packets in each of the spatial layers, which the demultiplexer 401 divided, error correcting coding 402 by the turbo coding etc., the repetition processing 403 and the modulation 404 by QPSK (Quaternary Phase Shift Keying) or the like are carried out for each of the packets. Information on code or coding rate of error correction, a modulation system or the like is included in packet format information, and the packet format is determined by the PF decision unit 408 of the transmitter according to information of the radio channel quality, CQI (Channel Quality Indicator) to be included in control information to be communicated from the receiver. Repetition processing is controlled by the HARQ control unit 414 according to the packet format to be acquired by the PF decision unit 408 of the transmitter, or the ACK/NAK response included in the control information to be communicated from the receiver.

The spatial layer mapping unit 410 carries out the mapping of M pieces of packets between Mt pieces of antenna elements of the transmitter, and carries out the coordination of "which of the packets should be transmitted by using which of the antenna elements". This procedure is controlled by the spatial layer control unit 415.

For a packet carried out mapping to a transmitting antenna element, multi-carrier modulation by IFFT (Inverse Fast Fourier Transform) in the OFDM modulator 405, and CP (Cyclic Prefix) addition for increasing robustness against delayed waves in the radio channel are carried out.

After that, in the RF transmitter and receiver 406 which carries out the conversion of a base band signal between RF (Radio Frequency) signal, processing such as conversion to radio frequency (up-conversion) or power amplification is carried out, and the transmission packet is transmitted from the transmitting antenna element.

The receiver of FIG. 5 has a RF transmitter and receiver 506, a control unit 523, a receiving circuit (an OFDM demodulation unit 505, a spatial layer canceller 511, a MIMO signal processing unit 512, a demodulator 504, a spatial layer demapping unit 522, a derepetition unit 503, a decoder 502, a CRC check unit 503, and a multiplexer 501) and a transmission circuit not shown. The control unit 523 has a CQI decision unit 508, an ACK generation unit 514, a Rank decision unit 515, an assignment block processing unit 517, a PF (packet format) judgment unit 518, a spatial layer control unit 519, an HARQ control unit 520, and a number of spatial layers judgment unit 521, to process control information required in decoding and demodulation, or to control spatial layer information or HARQ.

In the receiver of FIG. 5, the received signals received by Mr pieces of antenna elements are firstly converted from radio frequency signals to base band signals (down-conversion) in the RF transmitter and receiver 506 which carries out the conversion of the base band signal between the RF signal. Still more, the received signal is divided to OFDM subcarriers by FFT (Fast Fourier Transform).

Subsequently, it is separated to signals in each of the spatial layers by the MMSE filter in the MIMO signal processing unit 512. It should be noted that radio channel information required in carrying out the weighing by the MMSE filter is acquired from a channel estimation unit 509. In addition, the spatial layer number, M, required here is communicated from the transmitter through the assignment block. By processing the assignment block acquired from a control information demodulation & decoding unit 516 at the assignment block processing unit 517, resource assignment information required for data decoding is acquired. The spatial layer number, M, acquired at the number of spatial layers judgment unit 521 by using the assignment block, is delivered to the MIMO signal processing unit 512 through the spatial layer control unit 519.

By carrying out the demodulation 504, HARQ derepetition 503, decoding 502 and CRC checking 513, for signals separated in each of the spatial layers, the received packets in each of the spatial layers are acquired. According to CRC check result, the ACK generation unit 514 generates the information of the decoding result. The ACK generation unit 514 generates the ACK (Acknowledgement) in the case of successful decoding, that is, when CRC check result is OK, and the NAK (Negative Acknowledgement) in the case of decoding failure, that is, when CRC check result is NG. Thus generated ACK or NAK is sent to a data transmitter as control information, through a control information coding & modulation unit 507.

The Rank number to be used at the number of spatial layers decision unit 409 of the transmitter, or CQI information to be used at the PF decision unit 408 is also sent to the data transmitter from the data receiver through the control information coding & modulation unit 507, as control information. The CQI decision unit 508 and the Rank decision unit 515 decide the channel quality CQI and the Rank number, respectively, based on radio channel information estimated in the channel estimation unit 509, based on received signals acquired from the OFDM demodulation unit 509. The CQI and the Rank number decided are delivered to the control information coding & modulation unit 507.

The packet format required for demodulation and decoding as well as the spatial layer number is communicated from the transmitter, by using the assignment block. By processing the assignment block to be acquired from the assignment block processing unit 517 in the PF judgment unit, the packet format is acquired, which is delivered to the demodulator 504 or the decoder 502.

Here, HARQ derepetition indicates utilization of a plurality of received subpackets by using function of the IR or the CC, and is controlled by the HARQ control unit 520. In the case where CRC check is OK, that is, decoding of a packet succeeds, the ACK response is generated at the ACK generation unit 514, which is communicated to the transmitter through the control information coding & modulation unit 507.

In the case where a packet decoded successfully is present, the SIC in the spatial layer canceller 511 increases SINR (Signal-to-Interference and Noise Power Ratio), and thus it is also possible to increase decoding possibility of a packet that is not yet decoded successfully.

By subjecting the packet decoded successfully to coding, repetition, and modulation again at a replica generation unit 510 to reproduce a base band transmit signal, and by passing it through a channel virtually by using channel information acquired from the channel estimation unit 509, received signal components (replicas) of the spatial layer corresponding to the packet decoded successfully, are generated. By subtracting these replicas from the received signals at the spatial layer canceller 511, signal components of the spatial layer corresponding to the packets decoded successfully, can be cancelled.

In this case, because the MMSE filter of the MIMO signal processing unit 512 functions as maximum ratio combining diversity, the SINR of the received signals of the spatial layers corresponding to that packets that are not yet decoded successfully is enhanced. When packet decoding succeeds in all of the spatial layers, these packets are combined by the multiplexer 501 to acquire the received data.

In carrying out the data transmission by using a transmitter of the above MCW-MIMO system, re-transmission control by the HARQ is carried out independently in each of the spatial layers. Because a radio channel state is different in each of the spatial layers, the number of re-transmissions differs among the spatial layers. In such a case, in the case where packet transmission is not terminated in other spatial layers while packet transmission is terminated in some of the spatial layers, data transmission is not carried out in a spatial layer where packet transmission is terminated, which results in a released layer. Accordingly data transmission is carried out by using the released layer.

Figure 6:
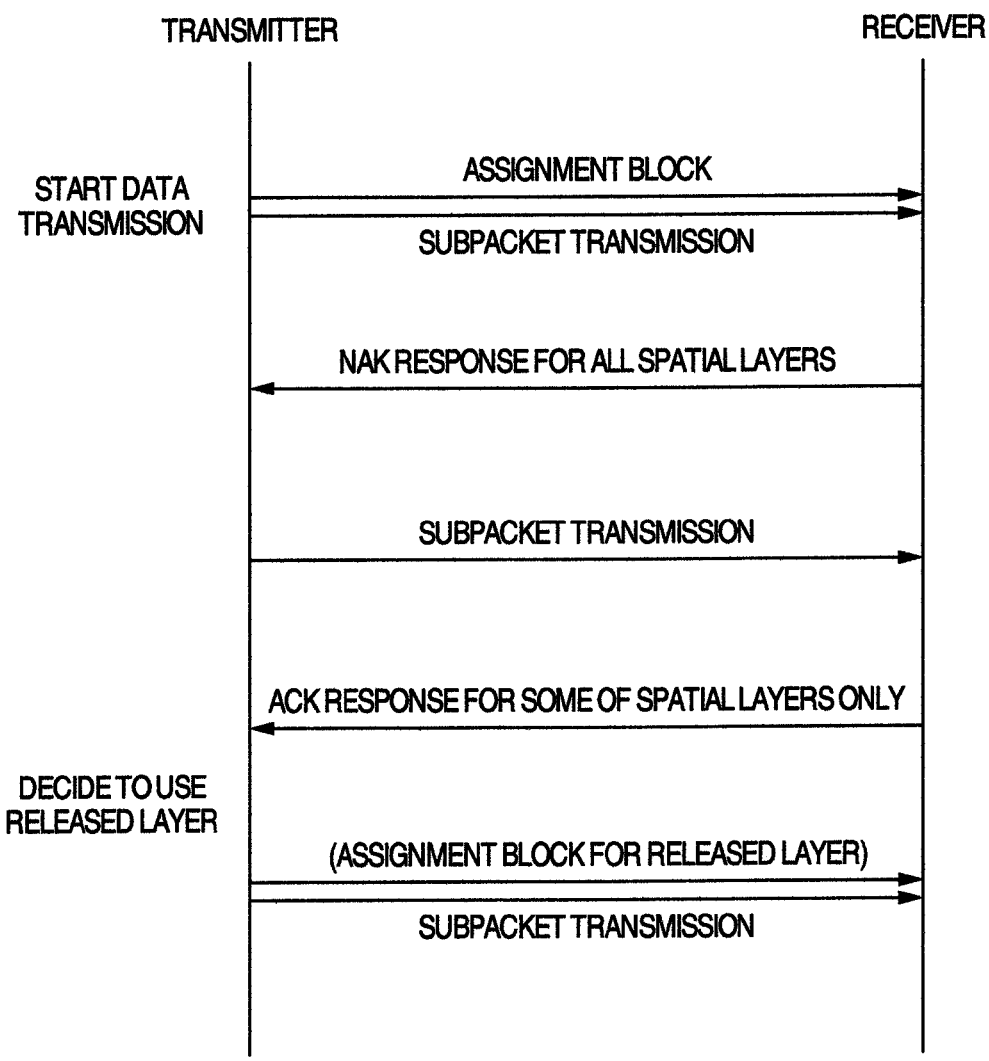
FIG. 6 is a drawing showing procedures for carrying out the data transmission in a released layer.

FIG. 6 shows procedures for carrying out the data transmission in a released layer. Usually, in starting data transmission, as shown in FIG. 6, along with carrying out the first subpacket transmission, the transmitter notifies the assignment block generated at the assignment block generation unit 411, to the receiver. The assignment block includes the scheduling information on, for example, which frequency channel (OFDM subcarrier) is used for data transmission, or in which packet format is used for data transmission or the like.

FIG. 7 shows an example of an assignment block, specifically a Channel ID field 703 indicates a frequency channel to be used for data transmission, and a PF field 705 indicates a packet format. In addition to these, a Block Type field 701 indicates a type of the assignment block, a Subtree ID field 704 indicates ID of a spatial layer to be used, a Pilot MIMO field 706 indicates information on a pilot signal type or transmission beam, and a HARQ field 707 indicates re-transmission period in HARQ control, respectively. Still more, a Sticky field 702 indicates whether the Sticky mode is used as an option or not, an Ext Tx field 708 indicates whether the Extended Transmission Mode is used as an option or not, and a Supplemental field 709 indicates whether the Supplemental Transmission Mode is used as an option or not, respectively.

The receiver acquires the control information required for receiving data, from the assignment block, in the assignment block processing unit 517. In an example of FIG. 6, because decoding results of the first subpacket transmission are failure for all spatial layers in the CRC check unit 513, the receiver generates the NAK response in the ACK generation unit 514 for all spatial layers, and sends it to the transmitter. The transmitter which received the NAK response for all spatial layers, transmits the second subpackets in all spatial layers. In FIG. 6, in the second subpacket transmission, the receiver responds the ACK in some of the spatial layers because decoding is terminated, and responds the NAK in other spatial layers because decoding is failed.

In this way, in the case where the ACK response is generated from the receiver only in some of the spatial layers, and the NAK response is generated in the other spatial layers, the transmitter recognizes the occurrence of released layers, and decides to start to use the released layer. Alternatively, after the transmitter recognizes the occurrence of the released layer, still more, the start of using the released layer may be decided also according to the channel quality information CQI of each of the spatial layers, which is a feed-back from the receiver. For example, in the case where the CQI of the spatial layer corresponding to a non-terminated packet is inferior as compared with the CQI of the released layer, the transmitter decides to start to use the released layer.

Figure 14:
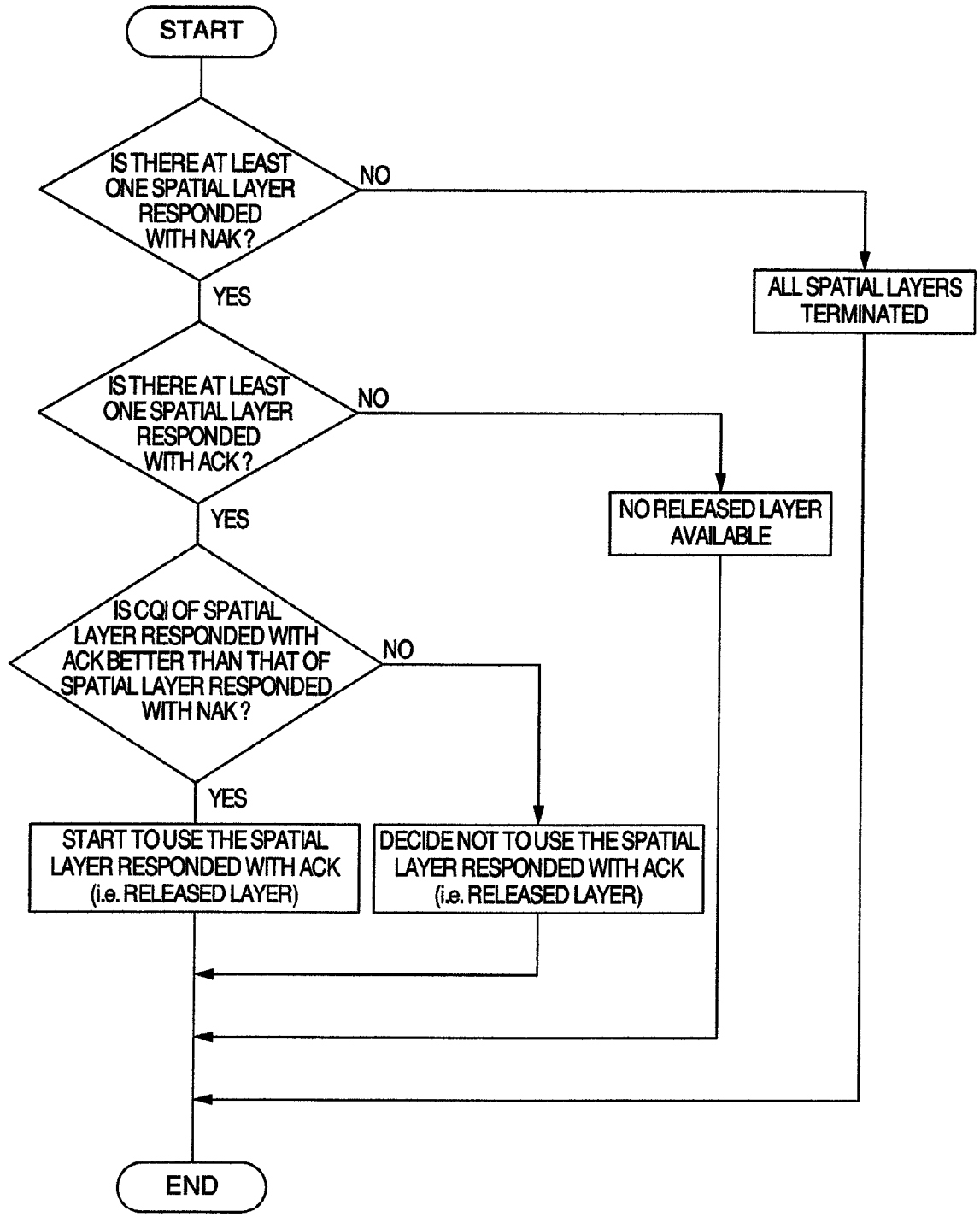
FIG. 14 is a drawing showing a flow of decision to start to use a released layer.

FIG. 14 shows a flow of decision to start to use the above released layer. The HARQ control unit 414 of the transmitter delivers the information on the ACK/NAK response from the receiver to spatial layer control unit 415, at the same time controls the re-transmission in the layer responded with NAK. Based on this information, in the spatial layer control unit 415, the start of using the released layer is decided according to a flow of FIG. 14.

Next, in carrying out the data transmission using the released layer, information is required to communicate from the transmitter to the receiver, notifying that use of the released layer is started. Notification, that use of the released layer is started, may be carried out by using, for example, the assignment block of FIG. 7.

In the case where notification, that use of the released layer is started, is carried out by using the assignment block, the transmitter indicates the ID of the released layer to be used in the Subtree ID field 704, and a frequency channel to be used in the Channel ID field 703, generates the assignment block in the assignment block generation unit 411, and transmits it to the receiver.

The receiver that received the assignment block processes this in the assignment block processing unit 517, and tries data receiving in the specified frequency channel with checking the Channel ID field 703, however, the frequency channel specified by the assignment block for notifying the start of using the released channel, is the same as the frequency channel specified by the assignment block to be communicated at the first subpacket transmission. Therefore, the receiver can notice that a frequency channel assigned already to itself is re-assigned by the assignment block for notifying the start of using the released channel, and the receiver can thus recognize the start of using the released layer.

Which of the released layers should be used can be recognized by the receiver by checking the Subtree ID field 704. The receiver judges that the released layer specified by the Subtree ID 704 started to be used for data transmission, and carries out processing of demodulation and decoding. In this case, the spatial layer control unit 519 acquires the information on using released layer from the assignment block processing unit 517, and gives a direction to the spatial layer demapping unit 522 or the HARQ control unit 520, so as to carry out decoding with utilizing the released layer.

In the above, explanation was given on a method for notifying the start of using the released layer by using the assignment block used for a usual assignment of frequency channel, however, an dedicated assignment block for notifying the start of using the released layer, may be specified. However, it is required to change a Block Type field 701 that indicates kind of the assignment block, or the like, so that the receiver can distinguish the dedicated assignment block for notifying the start of using the released layer.

Figure 15:
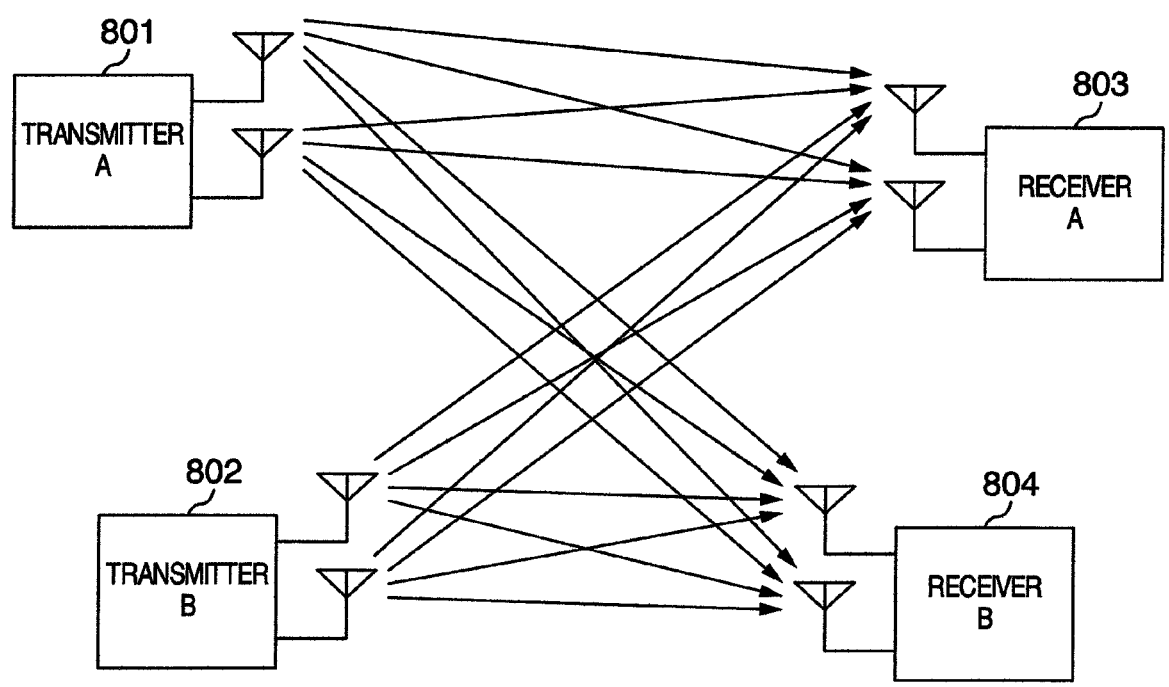
FIG. 15 is a schematic drawing of a system in the case of applying the present invention to a combination of a plurality of transmitters and a plurality of receivers.

In the above, action in combination of a single transmitter and a single receiver was shown, however, effective utilization of the released layer in the present invention is also applicable in the case where there are multiple transmitters and multiple receivers. Explanation will be given on the procedure in the case of combination of a plurality of transmitters and a plurality of receivers, with reference to FIG. 15.

First, explanation will be given on the procedure in the present invention, in the case where there are multiple transmitters and single receiver, that is, the transmitter A and the transmitter B carry out the data transmission to the receiver A. In this case, the MCW-MIMO transmission is carried out by assuming that the transmitter A and the transmitter B are separate antenna elements. For example, in FIG. 15, the effective utilization of such a released layer as in the present invention becomes possible, similarly as in the case of single transmitter, when the receiver A receives a signal transmitted from the transmitter A as the spatial layer 1, and receives a signal transmitted from the transmitter B as the spatial layer 2.

Figure 16:
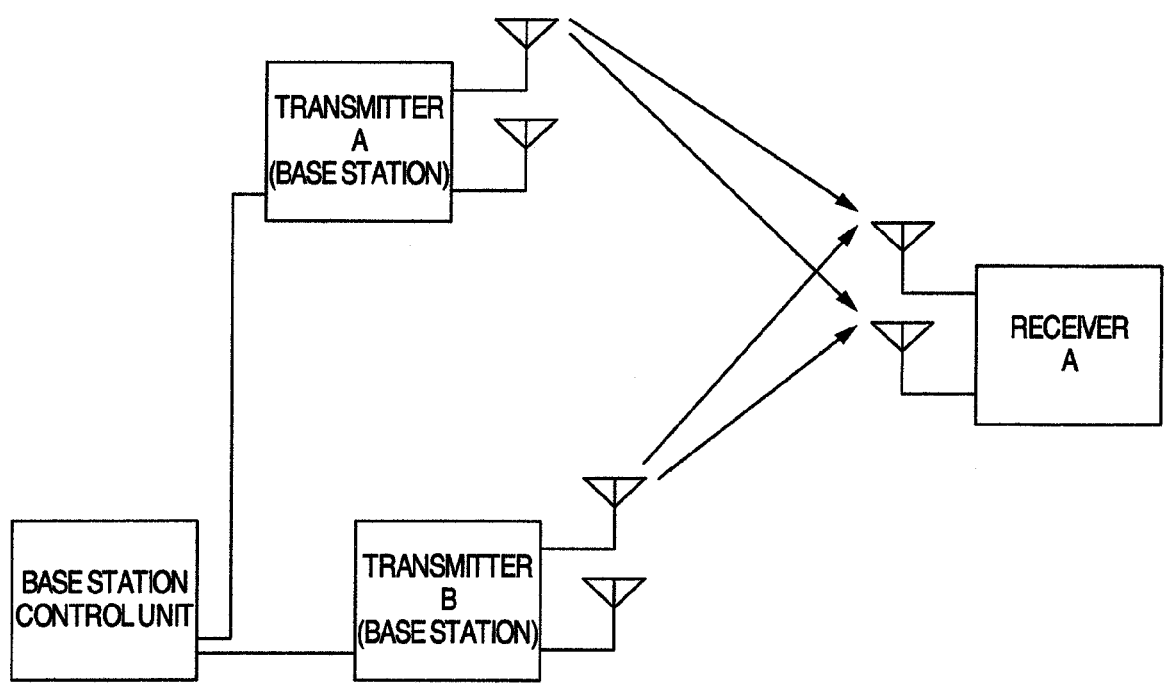
FIG. 16 is a schematic drawing of a system in the case of applying the present invention to data transmission from a plurality of base stations connected by a base station control unit.
Figure 17:
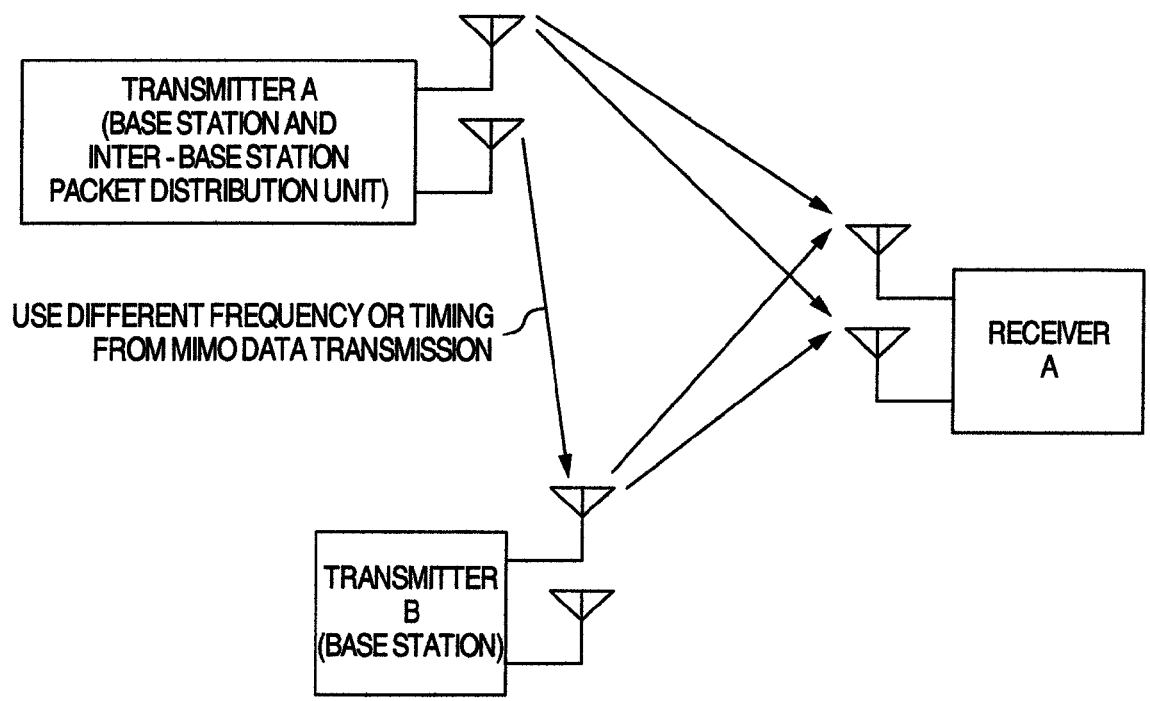
FIG. 17 is a schematic drawing of a system in the case of applying the present invention to data transmission from a plurality of base stations connected by wireless communication.

In this case, the transmitter A and the transmitter B are required to transmit the packets that are divided in each of the spatial layers from the same transmitted data. For example, in the case where the present invention is applied to a down link of a cellular wireless system, the transmitters become radio base stations, and the radio base stations are connected to the base station control unit, respectively, as shown in FIG. 16. By installing an inter-base station demultiplexer and an inter-base station spatial layer control unit to the base station control unit, and by controlling inter-base station packet distribution, effective utilization of the spatial layer of the present invention is possible. Alternatively, as shown in FIG. 17, also in case wireless stations communicate with each other with wireless connection, the present invention is applicable, however, in this case, who controls the inter-base station packet distribution is any one of the wireless stations.

On the other hand, in the case where the transmitter is a wireless terminal, the present invention is applicable when the transmitters communicate with each other with wireless connection. That is, one of the transmitters controls packet distribution to the spatial layers, and transmits some of the packets by a multi-hop scheme via the other transmitter, and the remaining packets are transmitted toward the receiver by itself. System configuration in this case is a similar one as in the case where the radio base station in FIG. 17 is substituted with the wireless terminal.

Explanation is given next on action in the present invention, in the case where there are multiple receivers, that is, in the case where the transmitter A carries out the data transmission to the receiver A and the receiver B. In this case, the MCW-MIMO transmission is carried out by assuming that the receiver A and the receiver B are separate antenna elements. For example, in FIG. 15, the effective utilization of such a released layer as in the present invention becomes possible, when the receiver A receives the spatial layer 1 among signals transmitted from the transmitter A, and that the receiver B receives the spatial layer 2 among signals transmitted from the transmitter A, respectively.

Figure 18:
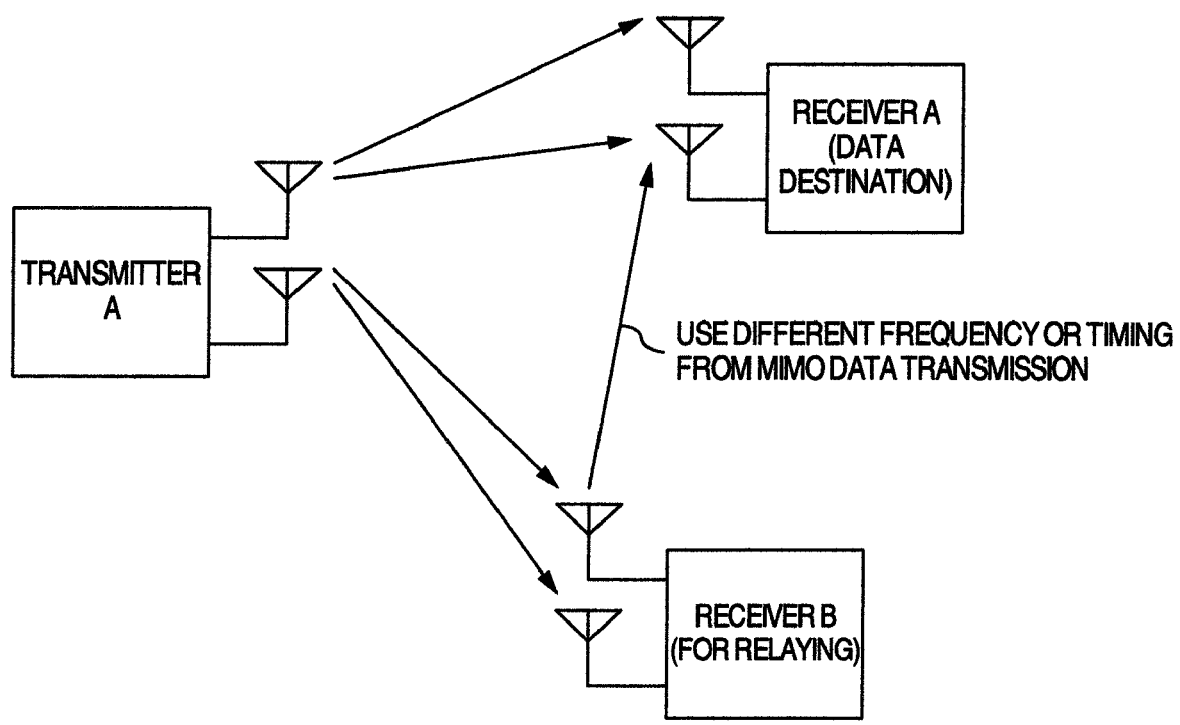
FIG. 18 is a schematic drawing of a system in the case of applying the present invention to data transmission using a plurality of receivers.

In this case, data transmitted from the transmitter A using a plurality of spatial layers is one originally addressed to a single receiver, for example, the receiver A, therefore, also a packet received by the receiver B must be delivered finally to the receiver A. This is made possible, as in FIG. 18, by transmitting the packet to the receiver A via the receiver B, using a multi-hop scheme.

Embodiment 1

Explanation is given on a first embodiment in the above wireless system, with reference to FIG. 8. In the first embodiment, a not-yet-transmitted subpacket of a non-terminated packet is transmitted by distribution to the firstly assigned spatial layer and to the newly generated released layer, at the occurrence of the released layer.

Decision of the start of using the released layer is carried out, as already explained, in the spatial layer control unit 415 of the transmitter. The spatial layer control unit 415 carries out inter-layer distribution of the packet to the spatial layer mapping unit 410, when it determines the start of using the released layer.

In addition, in the receiver, the spatial layer control unit 519 gives a direction to the spatial layer demapping unit 522, so as to deliver a subpacket transmitted in the released layer to the derepetition 503 corresponding to the original spatial layer, by using information on a non-terminated layer acquired from the ACK generation unit 514, and information on use of the released layer acquired from the assignment block processing unit 517.

The HARQ control unit 520 gives a direction to the derepetition 503, so as to carry out the subpacket processing delivered from the spatial layer demapping unit 522, by using information on use of the released layer acquired from the spatial layer control unit 415.

FIG. 8 shows an example of the case where similar number of re-transmissions as in FIG. 3 is expected in each of the spatial layers. In FIG. 8, SPm,n represents the n-th subpacket to be transmitted in the m-th spatial layer, similarly as in FIG. 3. In an example of FIG. 3, packet transmission succeeds in 3 re-transmissions in the layer 0, and 2 re-transmissions in the layer 1. On the other hand, number of re-transmissions of the layer 2 is 5, and that of the layer 3 is 6, and the layer 0 becomes a released layer at the fourth transmission timing (frame 24), and the layer 1 at the third transmission timing (frame 16).

In this way, the subpackets to be transmitted originally in the layer 2 and the layer 3, are distributed to the firstly assigned original spatial layer and the released layer, and transmitted. In an example of FIG. 8, at the same time of transmission of the subpacket SP3,2 in the layer 3 in the third transmission timing (frame 16), the subsequent subpacket SP3,3, which is originally transmitted in the fourth transmission timing (frame 24), is transmitted in the layer 1, which is now a released layer.

Still more, in the fourth transmission timing (frame 24), the subpacket SP3,4 is transmitted in the layer 3, and the subpacket SP3,5 is transmitted in the layer 1, which was a released layer. In FIG. 8, the receiver decodes successfully at this point of time, and responds with the ACK in the frame 21. In addition, also the subpacket of the layer 2 is distributed to the layer 0 and is transmitted, and in the frame 24, the subpacket SP2,4 is transmitted in the layer 0.

As described above, by transmitting non-transmitted subpackets of a non-terminated packet by distributing to the firstly assigned spatial layer and to the newly generated released layer, the same number of the subpackets can be transmitted within shorter time as compared with the case of not using the released layer. Therefore, it is possible to shorten the time from start of data transmission to successful decoding in all spatial layers.

Embodiment 2

Explanation is given on a second embodiment in the above wireless system, with reference to FIG. 9 and FIG. 10. In the second embodiment, a subpacket of a non-terminated packet is transmitted not only in the firstly assigned spatial layer but also in a released layer.

Processing for transmitting the same subpacket in a plurality of spatial layers, such as the above, is carried out in the spatial layer control unit 415 and the spatial layer mapping unit 410 of the transmitter. The spatial layer control unit 415 gives a direction to the spatial layer mapping unit 410, so as to transmit a subpacket, which should be transmitted originally in a non-terminated layer, by copying to the released layer, based on decision on the start of using the released layer. In this way, transmission of the same packet in a plurality of spatial layers is attained.

On the other hand, the receiver gives a direction to the spatial layer demapping unit 522, so as to deliver a subpacket transmitted in the released layer to the derepetition 503 corresponding to the original spatial layer, by using information on terminated layer acquired from the ACK generation unit 514, and information on use of the released layer acquired from the assignment block processing unit 517. The HARQ control unit 520 gives a direction to the derepetition 503, so as to combine subpackets delivered from the spatial layer demapping unit 522 and transmitted in a plurality of spatial layers, by using information of use of the released layer acquired from the spatial layer control unit 415.

FIG. 9 shows an example of the case where the number of re-transmissions as in FIG. 3 is expected in each of the spatial layers. In FIG. 9, the layer 0 becomes a released layer at the fourth transmission timing (frame 24), and the layer 1 becomes a released layer at the third transmission timing (frame 16). In FIG. 9, in the third transmission timing (frame 16), in transmission of the subpacket SP3,2 of a packet transmitting in the layer 3, the same subpacket SP3,2 is transmitted also in the layer 1, which is a released layer.

In this way, the receiver is possible to receive the subpacket SP3,2 in the layer 1 and the layer 3, and by adding these powers, signal power can be increased. In this way, similar effect as the CC in the HARQ can be expected, and possibility of successful decoding can be increased. In FIG. 9, also in the fourth transmission timing (frame 24), the subpacket SP3,3 is transmitted not only in the layer 3 but also in the layer 1.

In an example of FIG. 9, description was given on a method for transmitting the same packet by using a plurality of spatial layers in the same time frame simultaneously. However, in the released layer, transmission may be started from the preceding subpacket of a non-terminated packet, for example, from the first subpacket. It is because, in the case where a systematic coding such as a turbo coding is used as an error correcting code, the large part of an original information bit sequence that is input to the coding processing and called the systematic bits in the codeword, is included in the first subpacket. That is, by increasing transmission opportunities of information bits, as compared with the redundancy bits used for error correction, possibility of successful decoding is increased.

Explanation will be given specifically on an example of the case of transmitting from the first subpacket of a non-terminated packet in a released layer, with reference to FIG. 10. In the frame 16 of FIG. 10, the first subpacket SP3,0 of the 3 is transmitted in the layer 1, at the same time of transmitting the subpacket SP3,1 of the non-terminated layer in the layer 3. In the next transmission timing (frame 24), the subpacket SP3,1 is transmitted in the layer 1, while the subpacket SP3,2 is transmitted in the layer 3. In the receiver, the subpacket SP3,0 transmitted to the frame 0 in the layer 3, and the subpacket SP3,0 transmitted to the frame 16 in the layer 1 are combined, and still more, the subpacket SP3,1 transmitted to the frame 8 in the layer 3, and the subpacket SP3,1 transmitted to the frame 24 in the layer 1 are combined.

In this way, by increasing signal power, similar effect as the CC can be expected, and possibility of successful decoding can be increased.

Embodiment 3

Explanation will be given on a third embodiment in the above wireless system, with reference to FIG. 11. In the third embodiment, redundancy bits of a non-terminated packet are transmitted using a released layer.

Operation for transmitting the redundancy bits in the released layer, such as the above, is carried out in the spatial layer control unit 415 and the spatial layer mapping unit 410 of the transmitter. The spatial layer control unit 415 decides the start of using the released layer in the manner already described. Still more, the spatial layer control unit 415 acquires information from the HARQ control unit 414, on which part of a packet that is delivered from the repetition 403 corresponding to each of the spatial layers to the spatial layer mapping unit 410 through the modulator 404, should be transmitted, that is, information on which part is the redundancy bits. Based on this information, the spatial layer control unit 415 gives a direction to the spatial layer mapping unit 410, so as to transmit the redundancy bits sequence in the released layer.

In addition, the receiver gives a direction to the spatial layer demapping unit 522, so as to deliver the redundancy bits sequence transmitted in the released layer to the derepetition 503 corresponding to the original spatial layer, by using information on terminated layer acquired from the ACK generation unit 514, and information on use of the released layer acquired from the assignment block processing unit 517. The HARQ control unit 520 gives a direction to the derepetition 503, so as to process a subpacket delivered from the spatial layer demapping unit 522 and transmitted in the original spatial layer, and the redundancy bits sequence transmitted in the released layer, as one coding bits sequence, by using information on use of the released layer acquired from the spatial layer control unit 415.

FIG. 11 shows an example of the case where similar re-transmission times as in FIG. 3 is expected, in each of the spatial layers. In FIG. 11, PBm represents redundancy bits of a packet transmitted in the m-th spatial layer. In FIG. 11, the layer 0 becomes a released layer at the fourth transmission timing (frame 24), and the layer 1 at the third transmission timing (frame 16).

At the same time of transmitting the subpacket SP3,2 of a packet, which is transmitting in the layer 3 in the third transmission timing (frame 16), the redundancy bits of a packet transmitted in the layer 3 is transmitted in the layer 1 which is a released layer. Also in the fourth transmission timing (frame 24), the redundancy bits of a packet transmitted in the layer 3 is transmitted in the layer 1 which is a released layer.

By this operation, in the receiver, the redundancy bits can be acquired earlier, as compared with the case of not utilizing the released layer. In this way, by rapidly decreasing coding rate, similar effect as the IR in the HARQ can be expected, and possibility of early successful decoding can be increased.

Embodiment 4

Explanation will be given on a fourth embodiment in the above wireless system, with reference to FIG. 12. In the fourth embodiment, transmission of a subpacket of a non-terminated is carried out by not using an original spatial layer used in transmission of the non-terminated packet, but using a released layer.

Operation for substitution transmission of the subpacket of the non-terminated layer in the released layer, described above, is carried out in the spatial layer control unit 415 and the spatial layer mapping unit 410 of the transmitter. The spatial layer control unit 415 decides the start of using the released layer in the manner described already. Still more, the spatial layer control unit 415 gives a direction to the spatial layer mapping unit 410, so as to transmit the subpacket of the non-terminated layer, which is delivered to the spatial layer mapping unit 410 from the repetition unit 403 corresponding to each of the spatial layers through the modulator 404, not in the original spatial layer but in the released layer.

In addition, the receiver gives a direction to the spatial layer demapping unit 522, so as to deliver the subpacket transmitted in the released layer to the derepetition 503 corresponding to the original spatial layer, by using information on terminated layer acquired from the ACK generation unit 514, and information on use of the released layer acquired from the assignment block processing unit 517. In this case, because the derepetition 503 is not required to be aware whether the subpacket is transmitted in the original layer or the released layer, it carries out the same operation as in the case where the released layer is not used.

FIG. 12 shows an example of the case where similar number of re-transmissions as in FIG. 3 is expected, in each of the spatial layers. In FIG. 12, the layer 1 succeeded in decoding in the second subpacket transmission. This means that in the case where packet transmission is carried out in the layer 1, higher receiving quality is acquired, as compared with other spatial layers, and quality of radio channel of the layer 1 can be said better, as compared with other spatial layers.

Accordingly, in an example of FIG. 12, from the third transmission timing (frame 16), where the layer 1 becomes the released layer, packet transmission of the layer 3 is carried out in the layer 1. Because the layer 1 is expected to have better channel quality than the layer 3, transfer to the layer 1 has possibility of successful decoding in less number of re-transmissions, as compared with continuing subpacket transmission in the layer 3.

Whether radio channel quality of the released layer is practically good or not can be determined by the CQI information in each of the spatial layers to be fed back from the receiver. Therefore, when the CQI of the released layer is better than the CQI of the non-terminated layer in certain level or more, in comparing the CQI of the non-terminated layer and the CQI of the released layer, it may be determined to transfer a packet of the non-terminated layer having the worst CQI, to the released layer.

In this way, number of re-transmissions for the packet in the spatial layer, which required the highest number of re-transmissions if the released layer is not used, can be decreased, and packet transmission in all spatial layers can be terminated earlier as compared with the case of not using the released layer.

Embodiment 5

Explanation will be given on a fifth embodiment in the above wireless system, with reference to FIG. 13. In the fifth embodiment, new packet transmission is carried out in a released layer.

Operation for carrying out the new packet transmission in the spatial layer, as described above, is carried out in the spatial layer control unit 415, the spatial layer mapping unit 410, the HARQ control unit 414 and the demultiplexer 401 of the transmitter. The spatial layer control unit 415 decides the start of using the released layer in the manner described above. The spatial layer control unit 415 notify the HARQ control unit 414 of the start of using the released layer. The HARQ control unit 414 may reject the start of using the released layer, based on HARQ re-transmission state of a non-terminated layer.

In this case, the HARQ control unit 414 notifies the spatial layer control unit 415 of rejection of using the released layer, and it is decided to stop using the released layer. If it is decided to start using the released layer, the HARQ control unit 414 gives a direction to the demultiplexer 401, so as to provide a new packet to the released layer. The new packet provided by the demultiplexer 401 is delivered to the spatial layer mapping unit 410 via coding, repetition and modulation. The spatial layer mapping unit 410 transmits the new packet in the released layer, according to the direction of the spatial layer control unit 415.

In addition, the receiver notifies the spatial layer demapping unit 522 that the new packet was transmitted in the released layer, by using information on the terminated layer acquired from the ACK generation unit 514, and information on use of the released layer acquired from the assignment block processing unit 517. The new packet received is delivered from the spatial layer demapping unit 522 to the derepetition 503, the decoding unit 502 and the CRC check unit 513.

FIG. 13 shows an example of the case where similar number of re-transmissions as in FIG. 3 is expected, in each of the spatial layers. In FIG. 13, the layer 1 becomes the released layer at the third transmission timing (frame 16). Accordingly, in the layer 1, which is a released layer, transmission of other packets is carried out by using the third time (frame 16) or subsequent transmission timing. In FIG. 13, transmission of the new packets is started in the frame 16 in the layer 1, and decoding succeeds after transmission of the subpacket in the frame 24 and the frame 32.

However, in this case, transmission of the new packet to be carried out in the layer 1 is required to succeed in decoding till the frame 40, where the layer 3 having the highest number of re-transmissions succeeds in decoding. Therefore, coding rate may be decreased or a modulation scheme with low modulation order may be used, so that coding of the new packet succeeds in less number of re-transmissions. In carrying out the new packet transmission by the transmitter, the assignment block of FIG. 7 notifies the start of using the released layer, however, the coding rate or the modulation scheme may be indicated by using the PF field 705, which is a packet format.

In transmitting the assignment block for the new packet, decoding successfully in less number of re-transmissions is made possible by indicating of the packet format having low coding rate and low modulation order by the transmitter in advance.

In this way, operation of changing the packet format to be used in the released layer is carried out at the PF decision unit 408 according to a direction of the spatial layer control unit 415. The PF decision unit 408 notifies each of the coding unit 402 and the modulator 404 corresponding to the released layer, of the coding scheme and the modulation scheme based on the new packet format. In this way, the new packet format is applied to the new packet to be transmitted in the released layer. Still more, the PF decision unit 408 notifies the receiver of the assignment block for the new packet through the assignment block generation unit 411 and the control information coding & modulation unit 412.

The receiver acquires the packet format for the new packet in the PF judgment unit 518 from the assignment block for the new packet, which is acquired through the control information demodulation & decoding unit 516 and the assignment block processing unit 517. The PF judgment unit 518 gives a direction to the demodulator 504 and the decoding unit 502, so as to carry out demodulation and decoding using the new packet format for the released layer to be notified by the PF judgment unit 518. In this way, by applicating the new packet format, transmission of the new packet in the released layer becomes possible.

According to the present invention, in wireless communication, by utilizing the released layer, where data transmission is not carried out, in the MIMO system, utilization efficiency of a wireless resource can be enhanced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system for transmitting and receiving a packet between a transmitter and a receiver by an MCW-MIMO system, where a plurality of spatial layers are independently controlled for hybrid automatic re-transmission request (HARQ re-transmission), wherein said receiver has a plurality of antennas for transmitting and receiving a subpacket made by division of said packet, a HARQ control unit, a spatial layer control unit and an ACK generation unit;

said transmitter has a plurality of antennas for transmitting and receiving a subpacket made by division of the packet, a HARQ control unit, and a spatial layer control unit;

the ACK generation unit of said receiver generates an ACK response for some of the spatial layers, in the case of success in receiving the subpacket transmitted in some of the spatial layers among the packet transmitted in a plurality of spatial layers from said transmitter;

the spatial layer control unit of said transmitter decides whether the spatial layer corresponding to the ACK response noticed from said receiver is used or not as a released layer for using in transmission of other sub-packets; and said other sub-packets is transmitted and received by using said released layer.

2. The wireless communication system according to claim 1, wherein said transmitter provides an assignment block generation unit for generating an assignment block which notices the start of using said released layer.

3. The wireless communication system according to claim 2, wherein said assignment block comprises the information on number of the released layer to be used and a frequency channel to be used.

4. The wireless communication system according to claim 2, wherein said assignment block includes the information showing that it is an assignment block for starting to use said released layer.

5. The wireless communication system according to claim 1, wherein the spatial layer control unit of said transmitter controls the distribution of a non-terminated subpacket of said packet to said released layer and a spatial layer assigned with said packet before notice of said ACK response.

6. The wireless communication system according to claim 1, wherein the spatial layer control unit of said transmitter transmits the non-terminated subpacket of said packet by the spatial layer assigned with said packet before notice of said ACK response, and controls the transmission of a copy of said non-terminated subpacket in said released layer.

7. The wireless communication system according to claim 1, wherein the spatial layer control unit of said transmitter transmits of the non-terminated subpacket in the spatial layer assigned with said packet before notice of said ACK response, and controls the transmission of the terminated subpacket of said packet in the released layer.

8. The wireless communication system according to claim 1, wherein the spatial layer control unit of said transmitter controls the transmission of a redundancy bits sequence corresponding to said packet in said released layer.

9. The wireless communication system according to claim 1, wherein the spatial layer control unit of said transmitter the stops to transmit the non-terminated subpacket in the spatial layer assigned with some of the packets before notice of said ACK response, and controls the transmission of the non-terminated subpacket of said some of the packets in a released layer generated by termination of other packets.

10. The wireless communication system according to claim 1, wherein the spatial layer control unit of said transmitter controls to change the released layer generated by termination of some of the packets to a spatial layer for transmitting a new packet.

11. The wireless communication system according to claim 10, wherein said transmitter transmits the control information including selection of a modulation system having reduced coding rate and/or low modulation order to a receiver, in carrying out the transmission of the new packet in said released layer.

12. The wireless communication system according to claim 1, wherein the spatial layer control unit of said transmitter assumes the spatial layer corresponding to the ACK response as the released layer in the case where a channel state of the spatial layer corresponding to the ACK response is good, and does not assume the spatial layer corresponding to the ACK response as a released layer, in the case where a channel state of the spatial layer corresponding to the ACK response is bad, by comparing the channel state of the spatial layer corresponding to the above ACK response with the channel state of the spatial layer corresponding to the NAK response.

13. A transmitter for transmitting and receiving a packet by a MCW-MIMO system, where a plurality of spatial layers is independently controlled for hybrid automatic re-transmission request (HARQ re-transmission), between receivers, wherein said transmitter comprising:
a RF transmitter and receiver;
a transmitting circuit for dividing a packet added with redundancy bids into a plurality of subpackets, and outputting each of the subpackets to said wireless transmission and receiving circuit;
a transmission control unit comprising an HARQ control unit and a spatial layer control unit; and
a receiving circuit for receiving the subpacket from said RF transmitter and receiver, and carrying out the decoding processing in combination of the subpacket already received and a subpacket newly received;
wherein said spatial layer control unit decides whether or not the spatial layer received a notice of the ACK response of said packet is used as a released layer to be used for transmission of other subpackets, and controls so as to transmit said other subpackets by using said released layer.

14. The transmitter according to claim 13, wherein said transmission control unit provides an assignment block generation unit for generating an assignment block for notifying start of using said released layer.

15. The transmitter according to claim 14, wherein said assignment block comprises the information on the information on number of the released layer to be used and a frequency channel to be used.

16. A receiver for transmitting and receiving a packet by a MCW-MIMO system, where a plurality of spatial layers is independently controlled for hybrid automatic re-transmission request (HARQ re-transmission), between a transmitter, wherein said receiver comprising:
a RF transmitter and receiver;
a transmitting circuit for dividing a packet added with redundancy bids into a plurality of subpackets, and outputting each of the subpackets to said wireless transmission and transmitting circuit;
a transmission control unit comprising an HARQ control unit, a spatial layer control unit and a transmitting and receiving control unit having ACK generation unit; and
a receiving circuit for receiving the subpacket from said RF transmitter and receiver, and carrying out the decoding processing in combination of the subpacket already received and a subpacket newly received;
wherein said ACK generation unit generates the ACK response about a subpacket transmitted in some of the spatial layers, in the case of success in receiving, and
said spatial layer control unit controls so that other subpacket received in a spatial layer corresponding to said ACK response is subjected to decoding processing in response to a spatial layer assigned with other subpackets before said ACK response.

17. The receiver according to claim 16, wherein said control unit comprises an assignment block processing unit for taking out information on use of the spatial layer corresponding to the ACK response as a released layer from the assignment block transmitted from said transmitter.

18. A method for assigning a spatial resource in a wireless communication system for transmitting and receiving a packet between a transmitter and a receiver by an MCW-MIMO system, where a plurality of spatial layers are independently controlled for hybrid automatic re-transmission request (HARQ re-transmission), wherein
in the case of success in receiving a subpacket transmitted in some of the spatial layers, among a packet transmitted in a plurality of spatial layers from said transmitter, an ACK response is generated for some of the spatial layers by the ACK generation unit of said receiver;
whether the spatial layer corresponding to the ACK response transmitted from said receiver is used in transmission of other subpackets or not, is decided by the spatial layer control unit of said transmitter; and
the spatial layer decided to be used in the above, is assigned to transmission and receiving of other subpackets as a released layer.

\* \* \* \* \*